UNITED STATES PATENT OFFICE 2,152,438

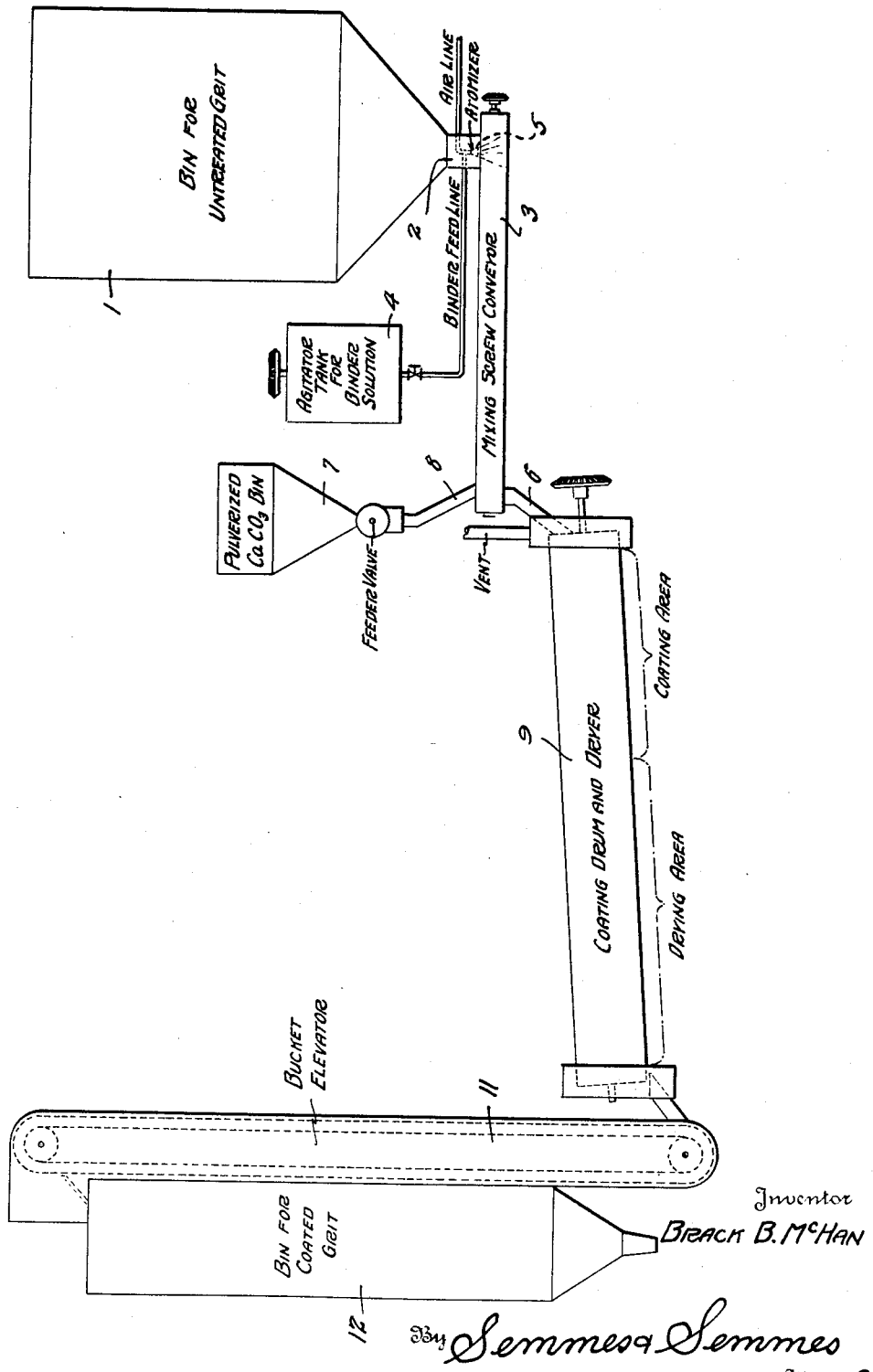

POULTRY FOOD

Brack B. McHan, Quincy, Ill., assignor to Calcium Carbonate Company, Chicago, Ill., a corporation of Illinois Application July 26, 1935, Serial No. 33,359

11 Claims. (Cl. 99—4)

This invention relates to a food product, and more particularly has reference to a grit feed for poultry.

As is well known, grit is an essential element in the ration of poultry, because it is necessary as a grinding medium in the digestive processes of the bird, and also (if the grit is calcareous in nature) it furnishes a supply of calcium in the diet. However, most so-called "raw", or untreated, grit presents two objections. In the first place, it is frequently of a relatively dark shade, and therefore not as attractive to the poultry as would be the case if it were whiter or more brilliant. In the second place, in so far as calcareous grit is concerned, the calcium present is not in as readily assimilatable a form as is sometimes necessary to promote the calcium metabolism of the fowl. Furthermore, it would be desirable to have the grit carry other diet values, such as, for instance, iodine, iron, copper, manganese, etc.

Efforts have heretofore been made to incorporate with poultry food these additional diet values. This has taken the form of including with the foods, such as mashes, ground salts of the desired minerals, such as potassium iodide and chlorides or sulphates of iron, manganese and copper. Serious disadvantages have resided in such attempts, however. It has been practically impossible to secure a uniform distribution of these values in the foods except at an almost prohibitive cost. Even if a thorough mixing of the food and salts is initially obtained, it is not possible to maintan such distributon because of the variance in the specific gravity of the mineral salts and the food particles. As a result, it is found that after transit, or other handling, the mineral salts are at the bottom of the bag or container. This is, of course, apt to be particularly true in view of the relatively small amounts of mineral salts that are mixed with a given quantity of the food.

Another serious objection to the attempts which have heretofore been made to incorporate various mineral salts in a poultry food has resided in the oxidation of certain of the salts. For instance, the iodine content is usually incorporated in the form of potassium iodide, which is relatively unstable when associated with many of the foods in which it is used. When certain of the salts (such as the sulphates and chlorides) of iron, manganese and copper are present with the potassium iodide, its decomposition is accelerated.

An object of this invention is to overcome the disadvantages inhering in former poultry feeds.

Another object of this invention is to provide a poultry grit that is attractive to the fowl to thereby increase its consumption.

Yet another object of this invention is to provide a poultry grit in which a calcium content is readily available.

A further object of this invention is to provide a poultry feed in which there are incorporated various mineral values essential to the ration of the fowl.

A still further object is to provide a poultry grit food which carries in a state of permanent uniform distribution a relatively small amount of various mineral salts.

And yet another object of this invention is to provide a poultry grit food carrying stable and uniformly distributed potassium iodide.

To accomplish the above, and other important objects, as will more fully appear hereinafter, my invention in general embraces the concept of incorporating with a poultry grit the requisite amount of certain food values for the proper diet. In the preferred form of my invention, the grit is also improved in attractiveness to the poultry. More specifically, I provide a coating for the grit to improve its appearance and to incorporate in either the grit itself or in the coating the desired food value. As will be observed hereinafter, my inventive concept may take various forms, and obviously my invention is not limited to the specific embodiments herein described.

To facilitate comprehension of the preferred embodiment of my invention, I have disclosed in the accompanying drawing a schematic diagram of an apparatus for carrying out the preferred process.

As above indicated, I prefer to employ a suitable grit particle as a base or carrying medium. Also, if a grit is employed, I desire to improve the appearance of the same so that it will be more attractive to the fowl. The specific type of grit employed will depend upon the desire of the manufacturer. While I have found a crushed limestone, of conventional poultry grit size, to be preferable, the grit may also be crushed oyster shells, granite, marble, flint, mica, or any other suitable grit-like material.

This grit may be treated in various ways so that it will carry the desired additional food values, and I will first describe the preferred process, in which the grit is treated with a binder in which is incorporated the desired food values, then dusted with pulverized calcium carbonate, and finally the coated product is dried to solidify the binder and calcium carbonate.

The crushed grit, of desired size, is contained in a suitable bin 1 and fed through a hopper 2 to a mixing screw conveyor 3. The mixing screw conveyor may be provided with the necessary paddles between its flights in order to insure an adequate mixing.

As the raw grit is fed to the conveyor 3, it is sprayed with a suitable binder supplied from an agitator tank 4 through an atomizing nozzle 5 which receives air under pressure from a suitable source. The rate at which the binder is fed can of course be properly adjusted for any given operation.

The specific binder employed may be optional with the operator, and I have found a casein solution or sodium silicate to be particularly efficacious. I find these two materials to be preferable in view of the fact that they are both substantially waterproof, and also that both have the proper alkalinity, as will be hereinafter adverted to. However, other types of binders, such as fats or fatty acids that are solid at ordinary temperatures, may be employed as binders, and may be introduced with the grit to conveyor 3 in a liquid or powdered form and maintained therein in a molten condition for coating by the pulverized calcium carbonate, to be later described.

According to my preferred embodiment, the desired mineral values are incorporated in the binder. The particular food value to be incorporated in the binder will of course depend largely upon the feeding requirements. In practically all normal feeds, however, there is an iodine deficiency, and I have found that iodine can be effectively supplied by my product. The specific iodine compound which I prefer is a potassium salt, such as potassium iodide, which may be added to the binder in the form of a solution, the strength and amount of the solution depending on the feeding requirements.

As pointed out above, potassium iodide oxidizes relatively fast, but I have found that, by regulating its pH value, oxidation is prevented, or at least very materially retarded. I prefer to have a pH value of 7 or better, and under most circumstances I provide a pH value of 9. I have found that in the case of casein or sodium silicate there is a sufficient inherent alkalinity so that it is usually not necessary to add any alkali. However, if other binders are used, and if they do not have the requisite pH value, an alkali, such as sodium hydroxide or other suitable alkaline agent, may be added.

Other mineral values, such as iron, copper, and manganese, may be incorporated in the binder in the desired amounts. These minerals may be supplied in the form of their salts, either inorganic or organic, or in the form of gluconates, lactates, citrates, ammonium citrates, or other compounds in which the minerals are readily available. As above mentioned, the salts of certain minerals, particularly the sulphates and chlorides of iron, manganese and copper, promote the oxidation of potassium iodide; and therefore it is usually considered poor practice to incorporate them with potassium iodide in a feed. However, I have found that, when the binder employed is casein or sodium silicate, or when some other binder is used in which the proper pH value is maintained, oxidation of the potassium iodide is prevented, or at least very materially curtailed, even in the presence of such salts. Furthermore, I have found that certain of the other compounds of such metals, such as the oleates, stearates and glucinates, do not have any, or only slight, catalytic action on the oxidation of the potassium iodide.

It will of course be appreciated that by the use of a binder such as above described, there is insured not only a uniform distribution of the additional food value on each particle of the grit, but also oxidation of the iodine salt is prevented.

After an intimate mixing and a uniform coating of the grit particles with the binder in the conveyor 3, they are discharged therefrom through pipe 6, along with pulverized calcium carbonate. This calcium carbonate may be limestone flour, or any other suitable pulverized calcareous material, such as, for instance, pulverized oyster shell, chalk, whiting, or precipitated calcium carbonate, and may be fed into the discharge end of the screw conveyor from a bin 7 through a pipe 8. A feeding mechanism may be interposed in the line 8 to control the amount of pulverized calcium carbonate fed to the grit particles.

The pipe 8 discharges into a coating drum and drier 9, the first section of the drum serving to insure a thorough and uniform coating of each particle with the pulverized calcium carbonate. As the coated grit progresses further along the drum, it is subjected to a drying step to solidify the binder and calcium carbonate coating. This drying is effected by means of burners or other suitable heating means (not shown), along the discharge end of the drum 9. The grit is discharged from the drum 9 into a bucket elevator 11 by which it is passed to a storage bin 12.

It will be observed that the coating of pulverized calcium carbonate which is imposed on each particle materially enhances the appearance of each particle, thereby making it more attractive to the fowl. Furthermore, the pulverized calcium carbonate coating of course provides calcium in a more available form than in the untreated grit.

In describing the preferred embodiment in detail, I by no means limit my inventive concept thereto. While such a process is desirable for reasons of economy and because of the quality of the finished product, there are various modifications which may be made therein.

For instance, with a brilliant and otherwise attractive raw grit, the additional food values may be incorporated in the grit itself. In such a situation, a solution of potassium iodide, of the desired strength, may be made up and a suitable alkali added to provide a pH value sufficient to prevent oxidation. If it is desired to supply other values, such as iron, copper and manganese, solutions of suitable compounds thereof might also be made up. The potassium and metallic solutions may be combined, and the raw grit soaked therein, or the grit may be soaked in the several solutions separately if such should, perchance, be desired. After sufficient soaking, the saturated grit may be removed and dried. Obviously the time involved in this type of treatment would be considerable, but, when the treatment is completed, the grit is effective for the intended purposes.

Of course, if it should be desired to coat the soaked grit, a coating such as described above in my preferred process (either with or without mineral values in the binder) may be applied, or any other suitable coating may be employed.

Another modification of my invention may be carried out by having the food values incorporated in the powdered coating. If an iodine salt is employed, it will of course be necessary to insure a proper pH value of the powder applied to the particle. A preferred incorporating of iodine in the powdered coating is disclosed in my copending application Serial No. 48,601, filed November 6, 1935, although of course other methods may be employed. Obviously the other mineral values may be incorporated in the powdered coating by introducing the same in the form of a solution during the grinding step, or by other methods in which a uniform distribution is secured.

Likewise, some or all of the mineral values may be carried by the grit, binder, and coating, or any two of these.

Still another form which my invention may take would reside in the spraying or dipping of the particles in hydrated lime in which desired mineral values may, or may not, be incorporated. If iodine is to be carried by the lime, it is apparent that the $Ca(OH)_2$ would have a sufficient pH value to prevent the oxidation of any contained iodine salts. If desired, the lime might be converted to calcium carbonate by subjecting it to a stream of carbon dioxide. This lime, or converted calcium carbonate, may be used with or without a binder or powdered coating.

While I have indicated several specific embodiments of my inventive concept, these are not to be taken as limitative, for there are other modifications which would be apparent to those skilled in the art.

It will be appreciated that my invention possesses considerable flexibility. It may be practiced to merely improve the appearance of the grit particles by the application of a powdered coating, or it may be employed to merely supply certain desired food values, According to the preferred embodiment, however, it will be noted that it accomplishes both of these results and insures a uniform distribution of the values on each particle, a supply of such values in readily assimilatable form, and prevents decomposition of such values. Such a grit may be economically manufactured from materials that may be readily secured.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. A food product comprising a grit-like particle and a stabilized iodine substance carried by the grit.

2. A food product comprising a calcareous grit-like particle and a covering therefor carrying stabilized KI.

3. A stable food product comprising a calcareous grit-like particle carrying stabilized KI and other mineral salts which normally would promote oxidation of unstabilized KI.

4. A food product comprising a calcareous grit, a coating of a pulverized calcareous material for the grit, and a binder causing the coating to adhere to the grit, said binder carrying KI and having a pH value of 7 plus.

5. A method of preparing a food product comprising treating a calcareous grit-like particle with a solution of KI and then drying the same.

6. A method of preparing a food product comprising spraying on a grit particle a binding agent containing an iodine compound, imposing on the sprayed particle a pulverized calcareous material, and then drying the same.

7. A method of preparing a food product comprising spraying a calcareous grit particle with a binding agent containing an iodine compound and having a sufficient pH value to prevent oxidation of the compound, and coating the sprayed particle with pulverized calcareous material.

8. A method of preparing a poultry food comprising crushing limestone to a grit size, spraying on the particles liquefied casein containing iodine, coating the sprayed particles with pulverized limestone, and then drying the product.

9. A food product comprising a grit-like particle, a coating therefor, and a binder causing the coating to adhere to the particle, said product carrying a stabilized iodine substance.

10. A food product comprising a calcareous grit-like particle carrying an iodine compound and an organic compound containing the fatty acid radical having a free bond, said organic compound being solid at atmospheric temperatures.

11. A food product comprising a grit-like particle carrying a substance containing the fatty acid radical, said substance being sold at atmospheric temperature, and an iodine compound associated therewith.

BRACK B. McHAN.